Nov. 18, 1941.   D. L. McCLURE   2,263,005
APPARATUS FOR BENDING GLASS SHEETS OR PLATES
Filed July 19, 1939   2 Sheets-Sheet 1
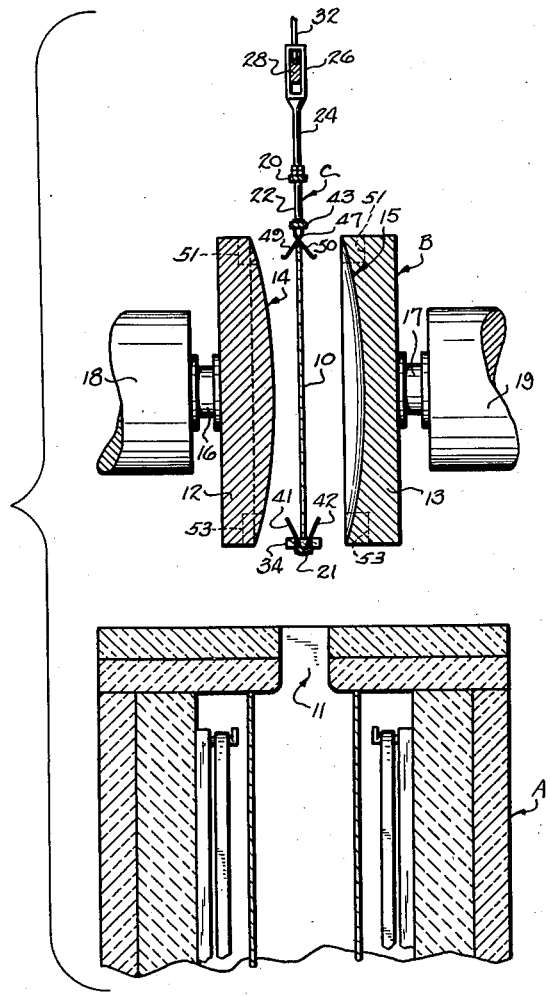
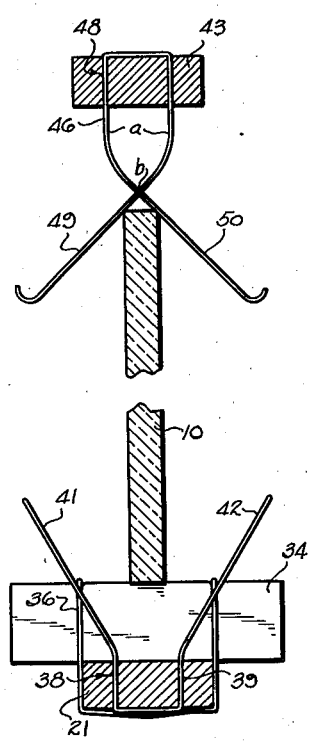
Fig. 4.
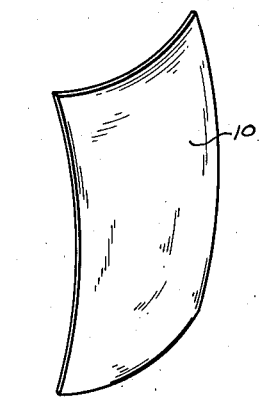
Fig. 5.
Inventor
DONALD L. McCLURE.
By Frank Fraser
Attorney Inventor
DONALD L. McCLURE.

Patented Nov. 18, 1941

2,263,005

UNITED STATES PATENT OFFICE 2,263,005

APPARATUS FOR BENDING GLASS SHEETS OR PLATES

Donald L. McClure, Toledo, Ohio, assignor to Libbey-Owens-Ford Glass Company, Toledo, Ohio, a corporation of Ohio Application July 19, 1939, Serial No. 285,230

10 Claims. (Cl. 49—14)

The present invention relates generally to the bending of glass sheets or plates and more particularly to improved means for supporting said sheets or plates during the bending thereof.

An important object of this invention is the provision of means for supporting the glass sheets or plates in a vertical position during bending and which is especially adaptable for supporting sheets or plates during the bending thereof to produce compound curves.

Another object of the invention is the provision of supporting means which will effectively maintain the glass sheets or plates in desired vertical position during bending while, at the same time, permitting sufficient freedom of movement thereof to effect proper bending.

A further object of the invention is the provision of supporting means for the glass sheets or plates so constructed that bending of the said sheets or plates may be accomplished with considerably less liability of breakage or cracking of the glass and with practically no marring of the sheet surfaces.

Other objects and advantages of the invention will become more apparent during the course of the following description, when taken in connection with the accompanying drawings.

In the drawings, wherein like numerals are employed to designate like parts throughout the same:

Fig. 1 is a vertical sectional view through bending apparatus constructed in accordance with the invention;

Fig. 4 is a vertical section through the supporting means taken substantially on line 4—4 of Fig. 2; and Fig. 5 is a perspective view of a glass sheet after bending and having a compound curve.

Figure 2:
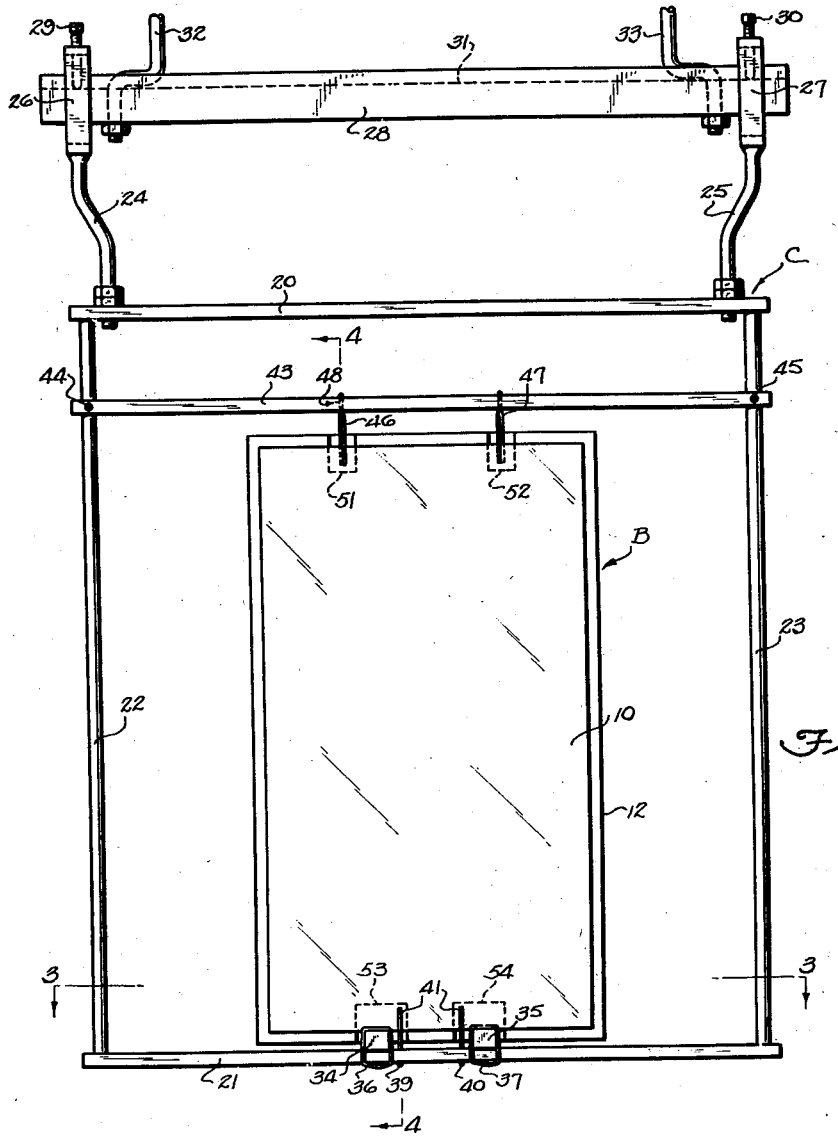
Fig. 2 is a front view of the sheet supporting means.
Figure 3:
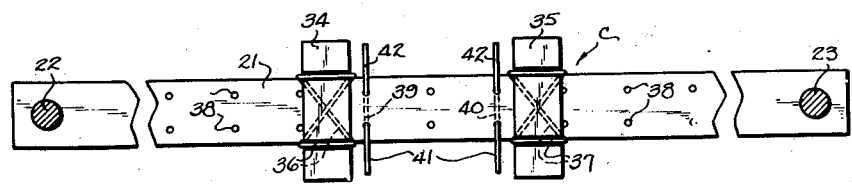
Fig. 3 is a horizontal section through the supporting means taken substantially on line 3—3 of Fig. 2.

With reference now to the drawings, the letter A designates in its entirety any suitable type of furnace in which the glass sheets to be bent are adapted to be heated to the required temperature for bending, while B designates generally the bending apparatus mounted above the furnace, and C the improved means herein provided for supporting the glass sheets during the heating and bending operations.

Although the bending apparatus B has been illustrated as being mounted directly above a vertical type furnace A, it will be understood that any suitable kind of furnace may be employed. Also, that the bending apparatus may be associated with the furnace in any desired manner, so that the invention is not limited to the use of any particular type of furnace or to any particular association between the furnace and bending apparatus.

After the glass sheet 10 to be bent has been brought to the proper temperature within the furnace A, it is adapted to be lifted vertically through the opening 11 in the top thereof into position for bending as shown in Fig. 1. The bending apparatus B comprises the horizontally spaced convex and concave bending or mold members 12 and 13 of any preferred width and height and provided with the inner complementary convex and concave bending surfaces 14 and 15 respectively, the curvature of which corresponds to the curvature to be given the glass sheet 10. The mold members 12 and 13 are movable horizontally toward and away from one another, and to this end may be carried by horizontal plungers 16 and 17 operating within cylinders 18 and 19 respectively. The horizontal movement of said mold members is controlled in any well known manner by hydraulic or air pressure within said cylinders.

Although the glass sheet 10 may be given any desired type of curvature by pressing between the mold members 12 and 13, the supporting means C herein provided is of particular utility for supporting a sheet which is being bent in a manner to provide a compound curve as shown in Fig. 5. As pointed out above, however, the curvature given to the sheet will of course depend upon the curvature of the bending surfaces 14 and 15 of the mold members so that the invention is not restricted to the making of compound bends.

The supporting means C for the glass sheet 10 includes a vertical rectangular supporting frame comprising the horizontal top and bottom bars 20 and 21 respectively, rigidly connected together at their opposite ends by the vertical rods 22 and 23. The frame is suspended from hangers 24 and 25 secured at their lower ends to the upper horizontal bar 20 and provided at their upper ends with the substantially rectangular collars 26 and 27 respectively which are slidably received upon the horizontal supporting member 28. As shown in Fig. 1, the width of the openings in the collars 26 and 27 is substantially the same as the thickness of the member 28, while the height of said openings is somewhat greater than the width of said member thereby permitting the collars to be moved vertically relative thereto to raise or lower the opposite sides of the supporting frame. This vertical adjustment is effected by screws 29 and 30 threaded downwardly through the tops of the collars 26 and 27 and received at their lower ends within a longitudinally extending groove 31 formed in the upper edge of the supporting member 28. The supporting member 28 may be hung from a crane or other suitable hoisting and conveying means by the hanger rods 32 and 33.

Mounted upon the bottom bar 21 of the supporting frame are a pair of spaced blocks or feet 34 and 35 for freely supporting the glass sheet 10 at its lower edge. The blocks 34 and 35 are preferably substantially rectangular and extend transversely of the bar 21. These blocks are also of a suitable insulating material and are secured to said bar by lengths of wire 36 and 37 which are inserted through openings 38 in the said bar and are wrapped around the said blocks in such a way as not to interfere with the supporting of the glass sheet directly thereupon. A plurality of pairs of openings 38 are provided in the bar 21 so that the blocks 34 and 35 may be secured in different positions longitudinally of the bar to provide for glass sheets of different widths as well as the bending thereof to different curvatures.

In order to prevent the lower edge of the glass sheet 10 from falling off of the blocks 34 and 35 during bending, there are provided the wire retaining members 39 and 40. Each of these members consists of a single length of wire having its opposite ends passed upwardly through a pair of opposed openings 38, as best shown in Fig. 4, with the upper end portions 41 and 42 of the wire being bent outwardly in upwardly diverging relation. The upper end portions 41 and 42 of the wire members are normally out of contact with the glass sheet 10 but serve to prevent accidental displacement of the bottom edge of the sheet from the blocks 34 and 35.

Extending between and slidably mounted upon the vertical rods 22 and 23 of the supporting frame is a horizontal cross member or bar 43 adjustably secured to said rods by set screws or the like 44 and 45. Carried by the cross bar 43 are a pair of spaced wire clips 46 and 47 which engage the upper edge of the glass sheet 10 to effectively maintain it in vertical position upon the supporting blocks 34 and 35. The cross bar 43 is also provided with openings 48 similar to the openings 38 in the bottom bar 21 and each wire clip 46 and 47 consists of a single length of wire having its opposite ends passed downwardly through a pair of the openings 48 as shown in Fig. 4. The opposite depending side portions *a* of each wire clip are bent in opposite directions so that they overlap one another as indicated at *b*, and terminate in the downwardly diverging arm portions 49 and 50 which yieldably engage the upper end of the glass sheet to maintain the said sheet in a vertical position. The wire clips 46 and 47 are so bent that they contact the glass sheet only at the upper edge thereof regardless of whether the glass is straight or bent.

In practice, the flat sheet of glass 10 to be bent is supported on edge upon the blocks 34 and 35 of the frame and held in such position by the wire clips 46 and 47 engaging the upper edge thereof. The frame and glass sheet are then lowered into the furnace A through the top opening 11 and the glass heated to the required temperature for bending. The frame and sheet are then lifted from the furnace into position for bending between the mold members 12 and 13 (Fig. 1). It is preferred that the mold members be of such size, both as to height and width, that when the glass sheet is brought into position therebetween for bending, it is disposed entirely within the area of said mold members. That is to say, the glass sheet does not project beyond the mold members either at the top or bottom or at the opposite side thereof. It has been found that when the glass sheet is arranged in this manner, the liability of breaking or cracking of the glass during bending is avoided. When the glass sheet projects beyond the mold members at the edges thereof so that said mold members do not engage the entire area of the sheet, there is a tendency for so-called chill cracks to develop in the glass where it projects beyond the mold members.

In order to support the glass sheet in this manner between the mold members, it will be seen that the supporting means engaging the upper and lower edges of the sheet (blocks 34 and 35, wire retaining members 36 and 37, and wire clips 46 and 47) will be partially disposed between the upper and lower portions of said mold members 12 and 13. To permit the mold members to be moved together to effect the bending of the glass sheet without interfering with or engaging the supporting means, the said convex and concave mold members 12 and 13 are provided at their upper ends with recesses 51 and 52 and at their lower ends with recesses 53 and 54. The recesses in the mold members are opposed to one another so that when said mold members are closed, the wire clips 46 and 47 at the upper edge of the sheet will be received within recesses 51 and 52, while the supporting blocks 34 and 35 and wire retaining members 39 and 40 will be received within recesses 53 and 54.

The supporting blocks 34 and 35 are adapted to be positioned relative to one another upon the bar 21 in such a manner that movement of the bottom edge of the glass sheet which rests upon the blocks will be reduced to a minimum during the bending operation. More specifically, it is preferred that the blocks be substantially positioned so that the glass rests on them at the points where a line parallel to the cord of the curve adjacent to the blocks bisects the rise of the glass after bending. The wire clips 46 and 47 engaging the upper edge of the sheet are also preferably positioned in the same manner.

After the glass sheet 10 has been bent, it can either be annealed by a slow and gradual cooling thereof or, if preferred, the bent sheet can be tempered by subjecting it to a sudden cooling or chilling treatment as well known in the art. The supporting means herein provided for the glass sheet may be advantageously used when the bent sheet is to be subsequently tempered, as it will not tend to mar the surfaces of the sheet or interfere in any way with the rapid cooling thereof.

It has heretofore been customary to suspend the glass sheet during tempering from a plurality of tongs engaging the same near its upper edge, but this type of support ordinarily results in considerable penetration of the surfaces of the sheet by the gripping elements, especially during the heating thereof when the glass is softened. Although in certain installations the indentations formed in the sheet by these gripping elements may be covered by a frame or sash, in many other cases the indentations cannot be covered and are objectionable. Due to the physical characteristics of tempered glass, it is not possible to cut the treated sheet and so remove the indentations because any attempt to cut the sheet results in a complete breakage thereof.

The supporting means herein provided will effectively support the glass sheet in a vertical position during bending and tempering, as well as being of such construction as to facilitate the handling of the sheet during the processing operations. The supporting means may also be used for supporting flat sheets of glass during the tempering thereof and is therefore not restricted to any particular use.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for supporting heated glass sheets in a vertical position during bending and/or tempering thereof, comprising means for freely supporting the sheet at its lower edge for unrestrained lateral movement, means engaging the upper edge of said sheet for maintaining it in a vertical position upon said supporting means, and means independent of the sheet supporting means and normally out of contact with the said sheet serving to prevent accidental displacement of the lower edge thereof from said supporting means.

2. Apparatus for supporting heated glass sheets in a vertical position during bending and/or tempering thereof, comprising spaced points of support for freely supporting the lower edge of the sheet for unrestrained lateral movement, means engaging the upper edge of said sheet at spaced points for maintaining it in a vertical position upon said spaced points of support, and separate means disposed at opposite sides of the sheet adjacent its lower edge and normally out of contact with the said sheet serving to prevent it from falling off of said spaced points of support.

3. Apparatus for supporting heated glass sheets in a vertical position during bending and/or tempering thereof, comprising means for freely supporting the sheet at its lower edge, means engaging the upper edge of said sheet for maintaining it in a vertical position upon said supporting means, and wire retaining members normally out of contact with the said sheet serving to prevent accidental displacement of the lower edge thereof from the said supporting means.

4. Apparatus for supporting heated glass sheets in a vertical position during bending and/or tempering thereof, comprising spaced points of support for freely supporting the lower edge of the sheet, means engaging the upper edge of said sheet at spaced points for maintaining it in a vertical position upon said spaced points of support, and wire retaining members having portions disposed at opposite sides of the sheet adjacent its lower edge and normally out of contact with the said sheet serving to prevent it from falling off of the said spaced points of support.

5. Apparatus for supporting heated glass sheets in a vertical position during bending and/or tempering thereof, comprising means for freely supporting the sheet at its lower edge, and wire clips fitting over and engaging the upper edge of said sheet for maintaining it in a vertical position upon said supporting means, each of said wire clips comprising a single length of wire having depending side portions bent in opposite directions so that they overlap one another and terminate in downwardly diverging arm portions which yieldably engage the upper end of the said sheet.

6. Apparatus for supporting heated glass sheets in a vertical position during bending and/or tempering thereof, comprising means for freely supporting the sheet at its lower edge for unrestrained lateral movement, wire clips fitting over and engaging the upper edge of said sheet for maintaining it in a vertical position upon said supporting means, and means independent of the sheet supporting means and normally out of contact with the said sheet serving to prevent accidental displacement of the lower edge thereof from the said supporting means.

7. Apparatus for supporting heated glass sheets in a vertical position during bending and/or tempering thereof, comprising a pair of spaced supporting elements for freely supporting the sheet at its lower edge for unrestrained lateral movement, and a pair of spaced wire clips fitting over and engaging the upper edge of said sheet for maintaining it in a vertical position upon said supporting elements, each of said wire clips comprising a single length of wire having depending side portions bent in opposite directions so that they overlap one another and terminate in downwardly diverging arm portions which yieldably engage the upper end of the said sheet.

8. Apparatus for supporting heated glass sheets in a vertical position during bending and/or tempering thereof, comprising a pair of spaced supporting elements for freely supporting the sheet at its lower edge, a pair of spaced wire clips engaging the upper edge of said sheet for maintaining it in a vertical position upon said supporting elements, and wire retaining members having portions disposed at opposite sides of the sheet adjacent its lower edge and normally out of contact with the said sheet serving to prevent it from falling off of the said supporting elements.

9. Apparatus for supporting heated glass sheets in a vertical position during bending and/or tempering thereof, comprising a vertical substantially rectangular frame including horizontal top and bottom members and vertical connecting side members, a pair of spaced blocks carried by said bottom member for freely supporting the sheet at its lower edge for unrestrained lateral movement, and a pair of wire clips carried by said top member fitting over and engaging the upper edge of the sheet for maintaining said sheet in a vertical position upon said blocks.

10. Apparatus for supporting heated glass sheets in a vertical position during bending and/or tempering thereof, comprising a vertical substantially rectangular frame including horizontal top and bottom members and vertical connecting side members, a pair of spaced blocks carried by said bottom member for freely supporting the sheet at its lower edge, a pair of wire clips carried by said top member engaging the upper edge of the sheet for maintaining said sheet in a vertical position upon said blocks, and wire retaining members also carried by said bottom member and having portions disposed at opposite sides of the sheet normally out of contact therewith but serving to prevent it from falling off of the said blocks.

DONALD L. McCLURE.